United States Patent
Kim et al.

(10) Patent No.: US 11,270,003 B2
(45) Date of Patent: Mar. 8, 2022

(54) SEMICONDUCTOR DEVICE INCLUDING SECURE PATCHABLE ROM AND PATCH METHOD THEREOF

(71) Applicant: Samsung Electronics Co., Ltd., Suwon-si (KR)

(72) Inventors: Kitak Kim, Siheung-si (KR); Kiseok Bae, Hwaseong-si (KR); Jinsu Hyun, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/858,963

(22) Filed: Apr. 27, 2020

(65) Prior Publication Data

US 2021/0117545 A1 Apr. 22, 2021

(30) Foreign Application Priority Data

Oct. 18, 2019 (KR) .................. 10-2019-0130091

(51) Int. Cl.
  *G06F 21/57* (2013.01)
  *G06F 8/65* (2018.01)
  *G06F 9/445* (2018.01)
  *H04L 9/08* (2006.01)

(52) U.S. Cl.
  CPC .......... *G06F 21/572* (2013.01); *G06F 8/66* (2013.01); *G06F 9/44594* (2013.01); *H04L 9/088* (2013.01); *G06F 2221/033* (2013.01)

(58) Field of Classification Search
  CPC ...... G06F 21/572; G06F 8/66; G06F 9/44594; G06F 2221/033; H04L 9/088
  See application file for complete search history.

(56) References Cited

U.S. PATENT DOCUMENTS

| | | | |
|---|---|---|---|
| 5,701,506 A | 12/1997 | Hosotani | |
| 6,009,524 A * | 12/1999 | Olarig | G06F 21/445 709/225 |
| 6,138,236 A * | 10/2000 | Mirov | G06F 9/24 712/E9.007 |
| 6,247,168 B1 * | 6/2001 | Green | G06F 8/60 700/17 |
| 6,976,163 B1 * | 12/2005 | Hind | G06F 21/572 713/1 |
| 7,898,862 B2 | 3/2011 | Murakami et al. | |

(Continued)

FOREIGN PATENT DOCUMENTS

| JP | H11249887 A | 9/1999 |
|---|---|---|
| JP | 2002-259148 A | 9/2002 |
| JP | 6107191 B2 | 4/2017 |

*Primary Examiner* — Phillip H Nguyen
(74) *Attorney, Agent, or Firm* — Harness, Dickey & Pierce, P.L.C.

(57) ABSTRACT

A method for patching a patchable function programmed in a read only memory (ROM) of a semiconductor device by using firmware loaded onto a first memory includes receiving an encrypted and digitally signed firmware image; generating a verification result by verifying the firmware image by using a public key; decrypting the firmware image by using a secret key depending on the verification result; loading firmware decrypted from the firmware image onto the first memory; and running a replacement function corresponding to an identifier of the patchable function included in the firmware, when the patchable function is called.

20 Claims, 10 Drawing Sheets

(56) References Cited

U.S. PATENT DOCUMENTS

| | | | |
|---|---|---|---|
| 8,000,735 B1* | 8/2011 | Barclay | H04W 88/02 |
| | | | 455/550.1 |
| 8,898,477 B2* | 11/2014 | Prevost | H04L 9/3234 |
| | | | 713/189 |
| 9,280,671 B2* | 3/2016 | Endo | G06F 21/74 |
| 9,348,597 B2 | 5/2016 | Neuerburg | |
| 9,348,730 B2 | 5/2016 | Odlivak et al. | |
| 9,880,856 B2 | 1/2018 | Akdemir et al. | |
| 10,067,864 B2 | 9/2018 | Hua et al. | |
| 10,997,297 B1* | 5/2021 | Lin | G06F 8/65 |
| 2003/0079097 A1* | 4/2003 | Wei | G06F 12/0638 |
| | | | 711/162 |
| 2003/0084229 A1 | 5/2003 | Ho et al. | |
| 2004/0006703 A1* | 1/2004 | Kitani | G06F 21/123 |
| | | | 713/193 |
| 2006/0174240 A1* | 8/2006 | Flynn | G06F 21/572 |
| | | | 717/170 |
| 2006/0174242 A1* | 8/2006 | Zhu | G06F 8/65 |
| | | | 717/172 |
| 2008/0052698 A1* | 2/2008 | Olson | G06F 9/44536 |
| | | | 717/168 |
| 2008/0313627 A1* | 12/2008 | Segawa | G06F 21/572 |
| | | | 717/171 |
| 2010/0023777 A1* | 1/2010 | Prevost | G06F 21/572 |
| | | | 713/180 |
| 2011/0113181 A1* | 5/2011 | Piwonka | G06F 8/65 |
| | | | 711/102 |
| 2011/0131447 A1* | 6/2011 | Prakash | G06F 21/572 |
| | | | 714/19 |
| 2013/0013849 A1 | 1/2013 | Varma et al. | |
| 2014/0164789 A1* | 6/2014 | Kaplan | G06F 21/572 |
| | | | 713/191 |
| 2016/0103994 A1* | 4/2016 | Murakami | G06F 21/572 |
| | | | 713/193 |
| 2017/0010881 A1* | 1/2017 | Kawazu | G06F 8/65 |
| 2019/0034195 A1 | 1/2019 | Pirvu et al. | |

* cited by examiner

SEMICONDUCTOR DEVICE INCLUDING SECURE PATCHABLE ROM AND PATCH METHOD THEREOF

CROSS-REFERENCE TO RELATED APPLICATIONS

This application claims priority under 35 U.S.C. § 119 to Korean Patent Application No. 10-2019-0130091 filed on Oct. 18, 2019, in the Korean Intellectual Property Office, the disclosures of which are incorporated by reference herein in their entireties.

BACKGROUND

At least some example embodiments of the inventive concepts disclosed herein relate to a semiconductor device, and in particular, relate to a read only memory (ROM) semiconductor device that is securely patchable by a function loaded onto a random access memory (RAM) and a patch method thereof.

Some of semiconductor devices constituting a mobile system (e.g., a smartphone, a tablet, a phablet, a wearable electronic device, etc.) may be driven through firmware like hardware independently of an application program or an operating system (OS). The firmware or functions are mainly programmed in a read only memory (ROM) and is executed in booting or when called. Accordingly, essential firmware or functions that do not need to update are programmed in the ROM of the semiconductor device.

However, it may be necessary to update the firmware or functions to a new version for stable performance and bug fix even after the semiconductor device is launched. For example, an error may occur at a function programmed in the ROM, or it may be necessary to apply items that are not considered when manufacturing the semiconductor device. To cope with this situation, various technologies are being proposed for updating the functions of the ROM. This technology may be referred to as patching, updating, or replacing the ROM.

Security attacks on systems including semiconductor chips are increasing, and attack technology is also progressing. Accordingly, there is an increasing demand on patching or replacing the ROM in consideration of security.

SUMMARY

At least some example embodiments of the inventive concepts provide a semiconductor device that is secure against an attack or an error when patching a function of a ROM by using firmware loaded onto the ROM and a patch method thereof.

According to at least one example embodiment of the inventive concepts, a method for patching a patchable function programmed in a read only memory (ROM) of a semiconductor device by using firmware loaded onto a first memory includes receiving an encrypted and digitally signed firmware image; generating a verification result by verifying the firmware image by using a public key; decrypting the firmware image by using a secret key depending on the verification result; loading firmware decrypted from the firmware image onto the first memory; and running a replacement function corresponding to an identifier of the patchable function included in the firmware, when the patchable function is called.

According to at least one example embodiment of the inventive concepts, a semiconductor device includes a ROM in which at least one patchable function is programmed, a RAM onto which firmware having a replacement function for replacing the at least one patchable function is loaded, a central processing unit (CPU) that performs user authentication on the firmware by running a firmware verification and decryption function programmed in the ROM and runs the replacement function by using the firmware when the at least one patchable function is called, secured storage that stores a public key and an electronic signature for the user authentication, and a secret key for decrypting the firmware, and a verification result register that stores a result of the user authentication, and the firmware includes a look-up table for mapping the at least one patchable function and the replacement function.

According to at least one example embodiment of the inventive concepts, a patch method of a semiconductor device which runs a first function programmed in a ROM includes receiving an encrypted and digitally signed firmware image to be loaded onto a RAM to replace the first function, performing user authentication on the firmware image, decrypting the firmware image and loading the decrypted firmware image onto the RAM, depending on a result of the user authentication, and running a second function included in the firmware depending on the result of the user authentication, when the first function is called.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
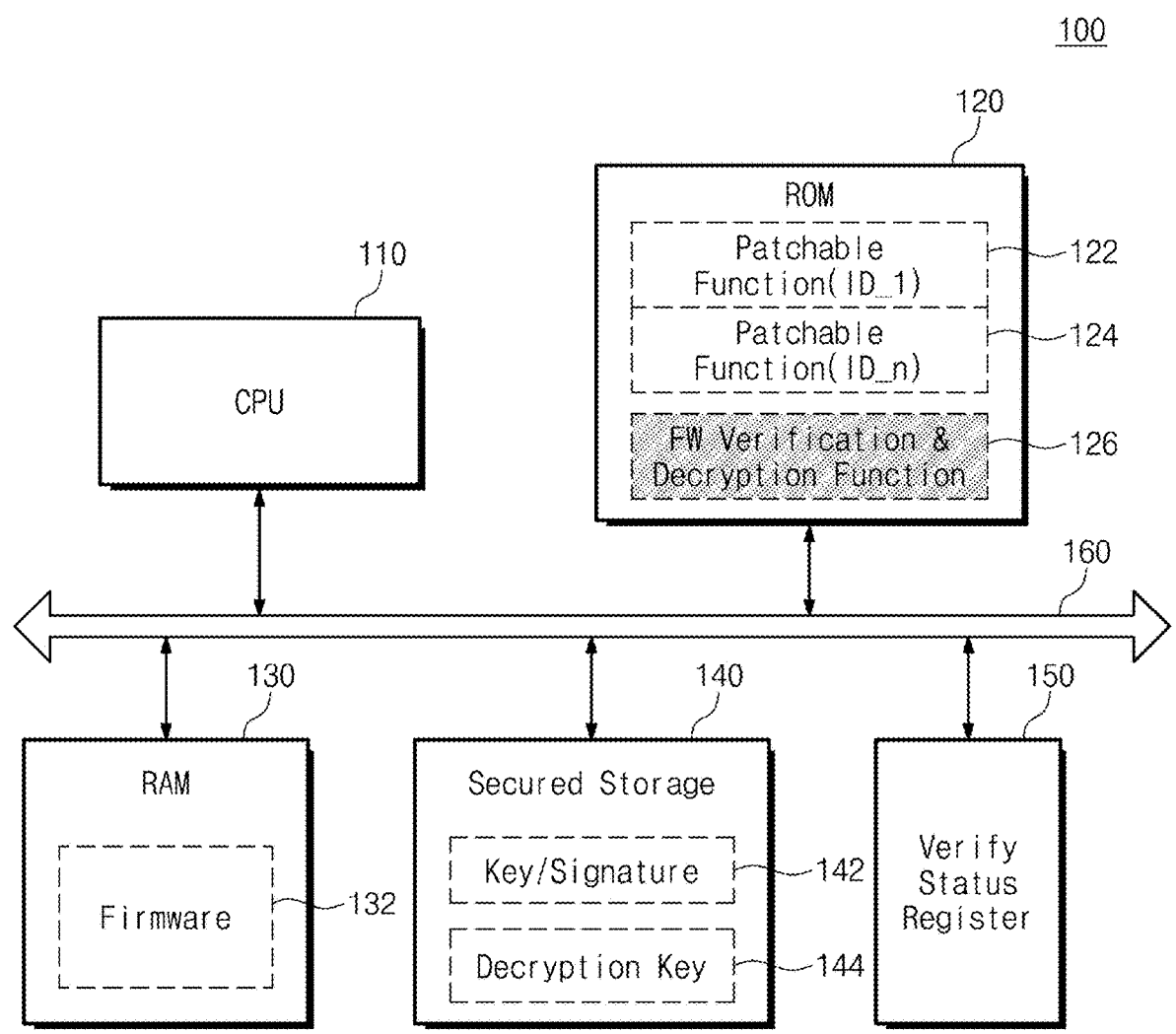
FIG. 1 is a block diagram illustrating a configuration of a semiconductor device according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Below, a ROM or a RAM included in a semiconductor device or a semiconductor chip may be used as components for describing a feature and a function of the inventive concept. However, one skilled in the art may easily understand other merits and performance of at least one example embodiment of the inventive concepts depending on the content disclosed here. The inventive concept may be implemented or applied through other embodiments. In addition, the detailed description may be changed or modified depending on view points and applications without departing from the claims, the scope and spirit, and any other purposes of the inventive concept. Also, the terms "patch", "update", and "replace" may be used below. However, all the terms may be used as a meaning indicating an operation of executing (or running) a replacement function loaded onto the RAM instead of a function implemented in the ROM.

Below, at least some example embodiments of the inventive concepts may be described in detail and clearly to such an extent that an ordinary one in the art easily implements the inventive concept.

FIG. 1 is a block diagram illustrating a semiconductor device 100 according to at least one example embodiment of the inventive concepts. Referring to FIG. 1, the semiconductor device 100 includes a central processing unit (CPU) 110, a ROM 120, a RAM 130, secured storage 140, a verify status register 150, and an interconnector 160. The semiconductor device 100 may replace functions programmed in the ROM 120 by using firmware or a function loaded onto the RAM 130 through the above components. Here, the semiconductor device 100 may be implemented with one chip or one semiconductor package. However, it may be well understood that the range of the semiconductor device 100 is not limited to the above example. An operation described in the present specification as being performed by firmware, a function, or an element of firmware or a function, may be performed by a processor (e.g., CPU 110, 210 and/or 310 which will be discussed in greater detail below with reference to FIGS. 1, 6 and 10, respectively) executing computer-executable instructions for causing the processor to perform the operation.

The CPU 110 may execute software or an application (e.g., an application program, an operating system, or device drivers) to be executed in the semiconductor device 100. The CPU 110 according to at least one example embodiment of the inventive concepts may run (or execute) firmware, a function, or a code programmed in the ROM 120 or firmware or a code loaded onto the RAM 130. The CPU 110 may run functions or firmware programmed in the ROM 120 depending on a boot sequence. In particular, in the case of calling a patchable function (e.g., 122) from the ROM 120, the CPU 110 may run a firmware verification and decryption function 126 from the ROM 120. Accordingly, the CPU 110 performs verification (or authentication) on firmware provided for the patch. When the verification is completed, the CPU 110 decrypts the firmware provided from the patch and loads the decrypted firmware onto the RAM 130. In this case, the CPU 110 may run a replacement function loaded onto the RAM 130 instead of the patchable function of the ROM 120. The operations will be described in detail with reference to drawings below.

Codes, firmware, or functions for driving or controlling the semiconductor device 100 may be programmed in the ROM 120. For example, firmware for performing basic functions of the semiconductor device 100 manufactured for a particular purpose may be programmed in the ROM 120. Alternatively, a code, which defines sequences to be performed in the process of starting the semiconductor device 100 (i.e., in booting), such as a boot loader may be programmed in the ROM 120. In particular, patchable functions 122 and 124 are stored in the ROM 120 according to at least one example embodiment of the inventive concepts. The patchable functions 122 and 124 mean functions or firmware to be patched (or replaced). In addition, the firmware verification and decryption function 126 for replacing or updating the patchable functions 122 and 124 may be programmed in the ROM 120.

The patchable functions 122 and 124 may be firmware or a function to be placed with functions loaded onto the RAM 130. That is, the code (e.g., computer-executable instructions) of the patchable functions 122 and 124 may not be changed. However, the patchable functions 122 and 124 may be replaced when the replacement function provided from the patch is present in the RAM 130. For example, the code (e.g., computer-executable instructions) of the replacement function may be executed in place of the code (e.g., computer-executable instructions) of the patchable functions 122 and/or 124. When the patchable functions 122 and 124 are called, the firmware verification and decryption function 126 may perform a function of verifying firmware provided for the patch and decrypting the verified firmware.

Various basic functions or codes for controlling and operating the semiconductor device 100 may be programmed in the ROM 120. The ROM 120 may be implemented with at least one of a mask ROM, a programmable ROM (PROM), an erasable PROM (EPROM), and an electrically erasable PROM (EEPROM), but the ROM 120 according to at least one example embodiment of the inventive concepts is not limited thereto.

The RAM 130 may be used as a working memory of the semiconductor device 100. Software (or firmware) or data for controlling the semiconductor device 100 may be loaded onto the RAM 130. The stored software and data may be driven or processed by the CPU 110. According to at least one example embodiment of the inventive concepts, a decrypted firmware 132 may be loaded onto the RAM 130. The decrypted firmware 132 may be a function for patching a function or firmware programmed in the ROM 120. The decrypted firmware 132 may be authenticated by using a public key and an electronic signature before being loaded onto the RAM 130. The patchable functions 122 and 124 may be replaced or updated by using the firmware 132 loaded onto the RAM 130.

The secured storage 140 is provided as a non-volatile storage medium of the semiconductor device 100. A public key/electronic signature 142 for authenticating the firmware 132 may be stored in the secured storage 140. The firmware 132 is provided to the semiconductor device 100 as encrypted image data. Accordingly, the decrypted firmware 132 is loaded after being decrypted by the firmware verification and decryption function 126. A decryption key 144 that is used to decrypt the firmware 132 may be stored in the secured storage 140.

The access of the remaining components other than the CPU 110 to the public key/electronic signature 142 and the decryption key 144 stored in the secured storage 140 may be blocked. The secured storage 140 may be implemented with a non-volatile memory. For example, the secured storage 140 may be implemented with a non-volatile memory, such as a flash memory, a PRAM, an MRAM, an ReRAM, or an FRAM, a one-time programming (OTP) memory, or a fuse.

The verify status register 150 stores a result of authenticating or verifying the decrypted firmware 132 loaded onto the RAM 130. Because the verify status register 150 stores the authentication result of the firmware 132 provided for patching the function or firmware implemented in the ROM 120, the verify status register 150 may not need to be implemented with a non-volatile memory. For example, the verify status register 150 may be implemented with a special function register (SFR) in which a function is defined in advance when the semiconductor device 100 is manufactured.

The interconnector 160 may be a bus or channel for providing a network between internal hardware components of the semiconductor device 100. The interconnector 160 may include, for example, a data bus, an address bus, and a control bus. The data bus is a path through which data are transferred. The data bus may mainly provide a memory access path through which the RAM 130 is accessed. The address bus provides an address exchange path between hardware components. The control bus provides a path through which control signals are transferred between hardware components. However, the configuration of the interconnector 160 is not limited to the above description. For example, the interconnector 160 may further include arbitration devices for efficient management.

According to at least one example embodiment of the inventive concepts, firmware or functions programmed in the ROM 120 may be patched by firmware or functions loaded onto the RAM 130. In particular, firmware or a function to be loaded onto the RAM 130 may require authentication in the patch process. Firmware or a function only verified through the authentication may be decrypted and loaded onto the RAM 130. Accordingly, the semiconductor device 100 according to at least one example embodiment of the inventive concepts may provide high-performing security against an attack or an error that may occur in the process of patching the ROM 120. In addition, the semiconductor device 100 according to at least one example embodiment of the inventive concepts may be implemented with a semiconductor chip that is mounted on a mobile application processor, a vehicle semiconductor device, or an Internet of Things (IoT).

Figure 2:
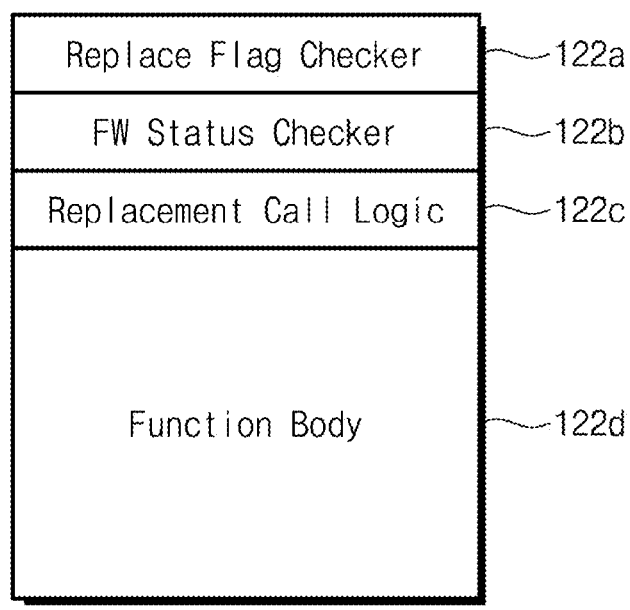
FIG. 2 is a block diagram illustrating a patchable function of a ROM of FIG. 1.

FIG. 2 is a block diagram illustrating a patchable function of a ROM of FIG. 1. Referring to FIG. 2, the patchable function 122 may include a replace flag checker 122a, a firmware status checker 122b, replacement call logic 122c, and a function body 122d, each of which may be embodied by, for example, computer-executable instructions within the patchable function 122. The above configuration of the patchable function 122 may be a minimum configuration for patching the function of the ROM 120 by using firmware loaded onto the RAM 130.

The replace flag checker 122a checks a value of a replacement flag included in the firmware 132. When the patchable function 122 is called from the CPU 110, first, the replace flag checker 122a checks whether the patchable function 122 is capable of being replaced with the firmware 132 loaded onto the RAM 130. The replacement flag indicating whether replacement functions included in the firmware 132 loaded onto the RAM 130 are capable of replacing respective functions of the ROM 120 may have to exist in a particular field of the firmware 132. The replace flag checker 122a checks the value of the replacement flag written in the firmware 132 and may determine whether it is possible to replace the patchable function 122.

The firmware status checker 122b checks a firmware verification status stored in the verify status register 150. When a value of a firmware verification status corresponds to a verify pass, the firmware status checker 122b performs a patch operation using the firmware 132. In contrast, when the value of the firmware verification status corresponds to a verify fail, the firmware status checker 122b may stop overall operations using the firmware 132. The firmware status checker 122b may set overall sequences such that the function body 122d programmed in advance in the ROM 120 is run.

The replacement call logic 122c monitors whether the patchable function 122 is called by the CPU 110. When codes or functions programmed in the ROM 120 are called, the patchable function 122 may be called, or a function that does not support a patch function may be called. When the patchable function 122 is called, the replacement call logic 122c may enable a sequence for patching a function or firmware.

The function body 122d is a function programmed in the ROM 120 for the purpose of performing an original function of the patchable function 122. Even though the patchable function 122 is called, when the authentication of the firmware 132 loaded onto the RAM 130 fails or when there is no need to replace the patchable function 122, the function body 122d may be executed.

Minimum information included in the patchable function 122 is briefly described above. However, it may be well understood that various functions are further added to the patchable function 122 depending on an authentication manner or an authority level.

Figure 3:
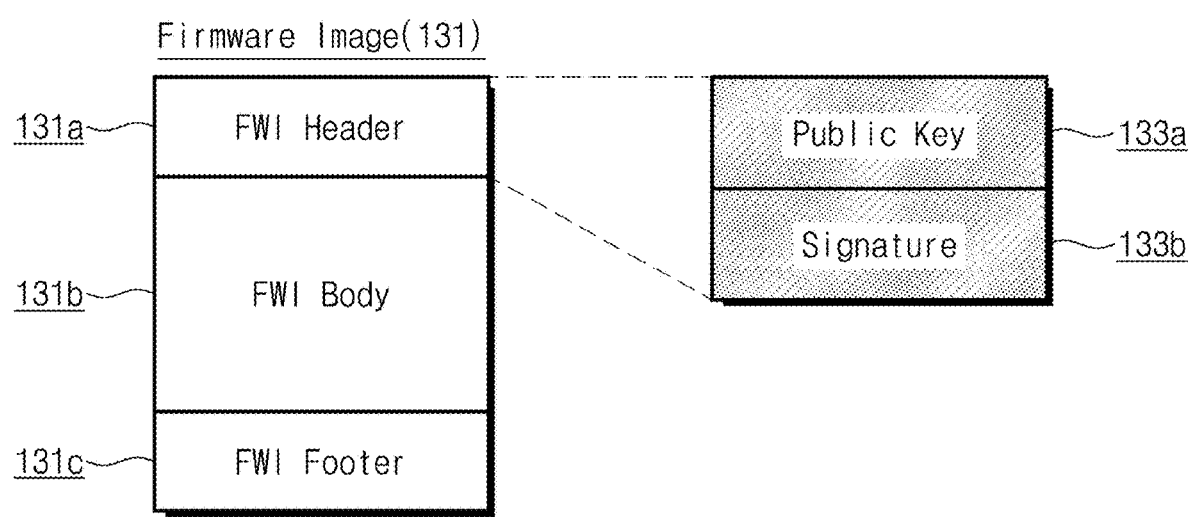
FIG. 3 is a diagram illustrating an image structure of firmware of FIG. 2.

FIG. 3 is a diagram illustrating an image structure of firmware of FIG. 2. Referring to FIG. 2, a firmware image 131 may include an image header 131a, an image body 131b, and an image footer 131c. The firmware image 131 is image data provided from the outside of the semiconductor device 100 for the purpose of updating or patching the patchable function 122 or 124 programmed in the ROM 120.

The image header 131a includes information that is used in an authentication procedure to be performed before the firmware image 131 is loaded onto the RAM 130. For example, the image header 131a may include a public key 133a and an electronic signature 133b for verifying whether the firmware image 131 is rightfully provided from an allowed supplier. The public key 133a may be compared with a public key included in the public key/electronic signature 142 stored in the secured storage 140. In the case where the public key 133a is not matched with the public key stored in the secured storage 140 or the electronic signature 133*b* is not matched with the electronic signature stored therein, the authentication of the firmware image 131 fails.

The image body 131*b* corresponds to main information of firmware for replacing the function body 122*d* of FIG. 2. However, the image body 131*b* may be encrypted; when the authentication is passed, the image body 131*b* may be loaded onto the RAM 130 after being decrypted. The image footer 131*c* may include various kinds of tag information of the firmware image 131.

When receiving the firmware image 131, the semiconductor device 100 according to at least one example embodiment of the inventive concepts performs authentication by using the public key 133*a* and the electronic signature 133*b*. A function that is implemented in the replacement function provided for the patch may be formed only by a legitimate user. The reason is that the replacement function formed by a malicious user threats a security system. Accordingly, the firmware image 131 must be encoded and digitally signed. A key to be used for both encryption and electronic signature must be stored in the secured storage 140 of the semiconductor device 100, and must be accessed and used only by the CPU 110 described above.

When the authentication of the firmware image 131 fails, the CPU 110 may stop a patch procedure and may run the function body 122*d* of the patchable function 122 programmed in the ROM 120. When the authentication succeeds, the CPU 110 may decrypt the image body 131*b* depending on the patch procedure and may store a result of the decryption in the RAM 130 as the firmware 132 for the patch.

Figure 4:
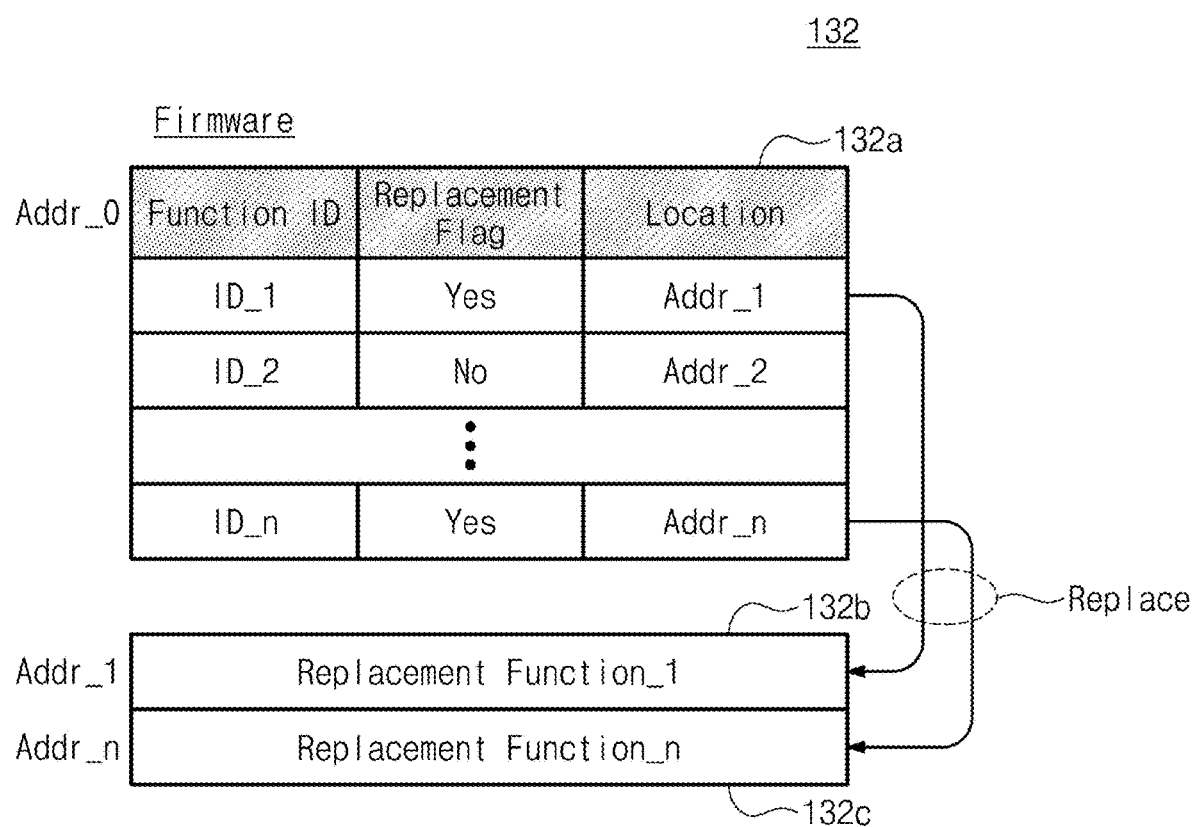
FIG. 4 is a diagram illustrating a structure of decrypted firmware of the inventive concept.

FIG. 4 is a diagram illustrating a structure of decrypted firmware according to at least one example embodiment of the inventive concepts. Referring to FIG. 4, the decrypted firmware 132 loaded onto the RAM 130 may include a look-up table 132*a* and replacement functions 132*b* and 132*c*.

When the patchable function 122 or 124 of the ROM 120 is run, the look-up table 132*a* provides the CPU 110 with information about whether replacement is possible and information about locations of the replacement functions 132*b* and 132*c* on the RAM 130. The look-up table 132*a* includes information about a function identifier (ID), a replacement flag, and a location of a replacement function. For example, it is assumed that the patchable function 122 of the ROM 120 is run by the CPU 110. When the function identifier of the patchable function 122 is "ID_1", the patch of the patchable function 122 may be performed with reference to information of the look-up table 132*a* corresponding to the function identifier "ID_1". With regard to the function identifier "ID_1" of the look-up table 132*a*, a value of the replacement flag corresponds to "Yes", and a location of the replacement function corresponds to an address Addr_1 of the RAM 130. Accordingly, the patchable function 122 may be patched by the replacement function 132*b* loaded at the address Addr_1 of the RAM 130.

In contrast, with regard to the function identifier "ID_2" of the look-up table 132*a*, a value of the replacement flag corresponds to "No". Accordingly, in the case where a function corresponding to the function identifier "ID_2" is run, the patch using the function or firmware loaded onto the RAM 130 may not be performed. A value of the replacement flag corresponding to the function identifier "ID_n" is "Yes". Accordingly, when a function corresponding to the function identifier "ID_n" is run, the patchable function 124 may be patched by the replacement function 132*c* loaded at the address Addr_n of the RAM 130.

Figure 5:
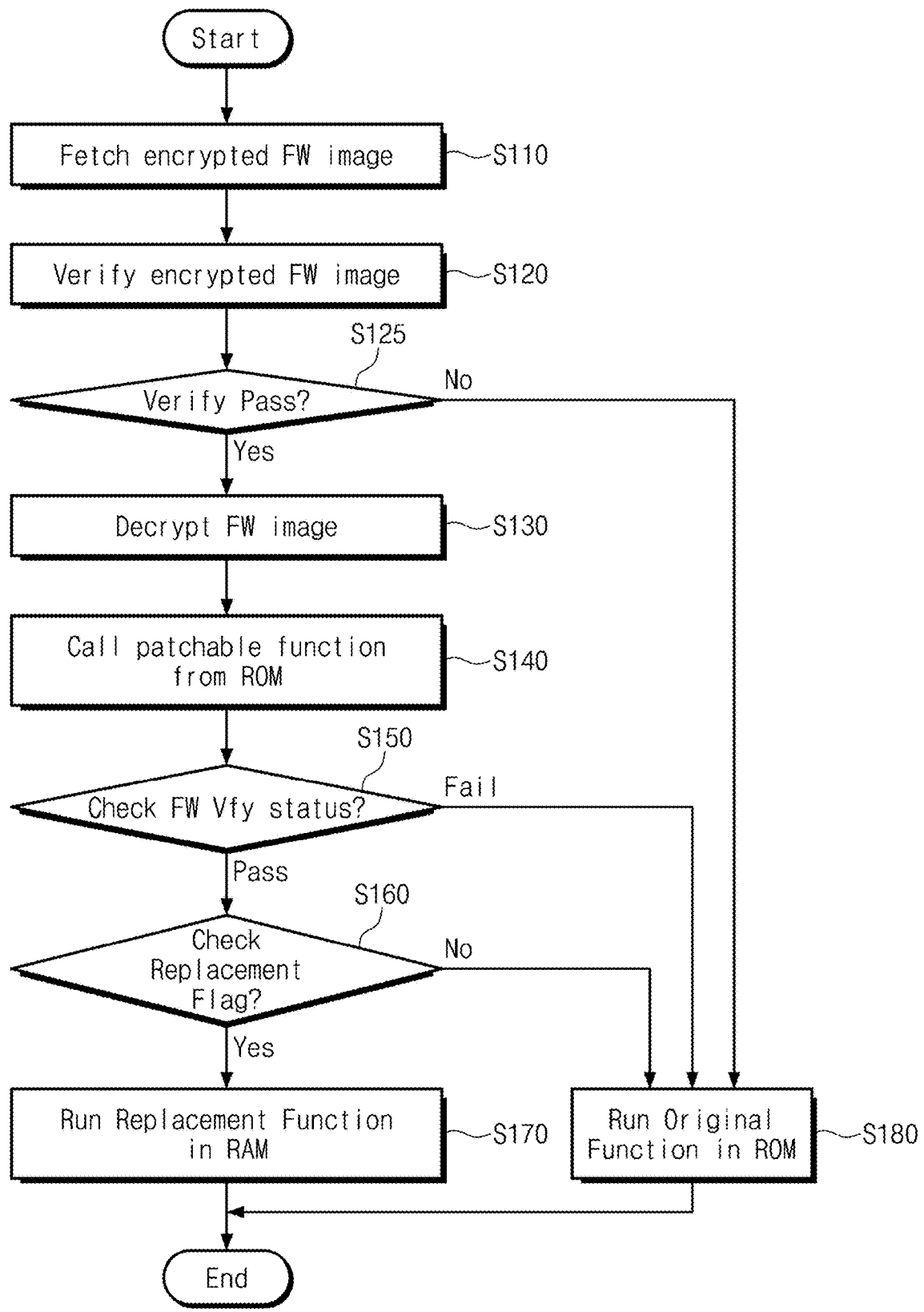
FIG. 5 is a flowchart illustrating a procedure of patching a function of a ROM according to at least one example embodiment of the inventive concepts.

FIG. 5 is a flowchart illustrating a procedure of patching a function of a ROM according to at least one example embodiment of the inventive concepts. Referring to FIG. 5, in the case where a patchable function or firmware programmed in the ROM 120 (refer to FIG. 1) is called, the semiconductor device 100 (refer to FIG. 1) according to at least one example embodiment of the inventive concepts performs verification and decryption on the firmware loaded onto the RAM 130 (refer to FIG. 1). Whether replacement is possible or a location of a replacement function may be checked with reference to the look-up table 132*a* (refer to FIG. 4) stored in the RAM 130.

In operation S110, the CPU 110 fetches or receives the firmware image 131 (refer to FIG. 3) encrypted and digitally signed. The firmware image 131 may be input from the outside of the semiconductor device 100. For example, the firmware image 131 may be provided from storage or update equipment that is provided to update the firmware of the semiconductor device 100.

In operation S120, the CPU 110 verifies the encrypted firmware image 131. For example, the CPU 110 may compare the public key 133*a* and the electronic signature 133*b* included in the firmware image 131 with the public key/electronic signature 142 stored in the secured storage 140 included in the semiconductor device 100. When a comparison result indicates that the public keys are not matched or the electronic signatures are not matched, it may be determined that the verification of the encrypted firmware image 131 fails. In addition, the CPU 110 stores the verification result of the encrypted firmware image 131 in the verify status register 150 included in the secured storage 140.

In operation S125, the CPU 110 performs the operation branch according to the verification result of the encrypted firmware image 131. When it is determined that the verification of the encrypted firmware image 131 fails (No), the procedure proceeds to operation S180. In contrast, when it is determined that the verification of the encrypted firmware image 131 succeeds (Yes), the procedure proceeds to operation S130.

In operation S130, the CPU 110 decrypts the encrypted firmware image 131. For example, the CPU 110 may decrypt the encrypted firmware image 131 by using the decryption key 144 (refer to FIG. 1) stored in the secured storage 140. The decrypted firmware 132 may be loaded onto the RAM 130. In the decryption process, the CPU 110 may generate the look-up table 132*a* and may generate an address Addr_i (i being a natural number) of each replacement function on the RAM 130. After the decrypted firmware 132 is loaded onto the RAM 130, the look-up table 132*a* may be used whenever patchable functions of the ROM 120 are called.

In operation S140, a patchable function is called by the CPU 110. For example, the one patchable function 122 of a plurality of patchable functions may be called. A call event of a patchable function may occur during booting or may occur while the semiconductor device 100 operates.

In operation S150, the CPU 110 checks the verify status register 150 for the purpose of determining the validity of the firmware 132. That is, to refer to a result of the verification performed in operation S120, the CPU 110 reads the verification result stored in the verify status register 150. When a value of the verify status register 150 corresponds to a verify fail, the procedure proceeds to operation S180. In contrast, when the value of the verify status register 150 corresponds to a verify pass, the procedure proceeds to operation S160.

In operation S160, the CPU 110 checks the replacement flag included in the look-up table 132*a*. For example, in the case of the patchable function 122 called in operation S140, the replacement flag corresponding to the function identifier ID_1 may be checked on the look-up table 132*a*. When a value of the replacement flag corresponds to "Yes" indicating "replaceable", the procedure proceeds to operation S170. In contrast, when the value of the replacement flag corresponds to "No" indicating "irreplaceable", the procedure proceeds to operation S180.

In operation S170, the CPU 110 runs the replacement function that is loaded onto the RAM 130 and is used to replace the called patchable function. For example, the replacement function 132*b* corresponding to the address Addr_1 associated with the function identifier ID_1 may be run instead of the patchable function 122 called in operation S140.

In operation S180, the CPU 110 may run the function 122 originally stored in the ROM 120. That is, in the case where the verification of the encrypted firmware image 131 fails or in the case where a value of the replacement flag corresponds to "No" indicating "irreplaceable", the CPU 110 must run the function body 122*d* of the patchable function 122 stored in the ROM 120.

According to at least one example embodiment of the inventive concepts, a method for verifying firmware loaded onto the RAM 130 for the purpose of replacing firmware or a function existing in the ROM 120 is briefly described above.

Figure 6:
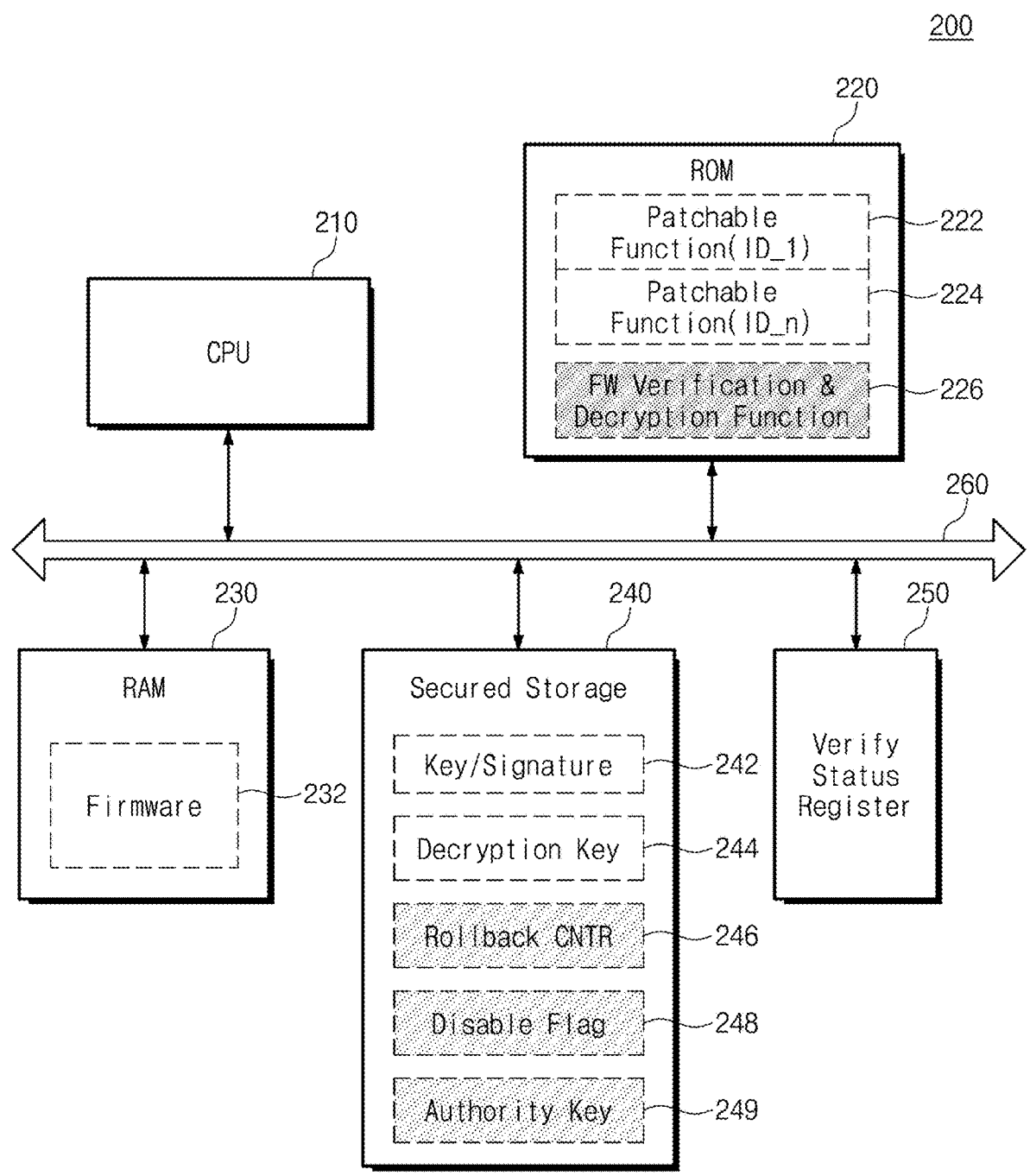
FIG. 6 is a block diagram illustrating a semiconductor device according to another embodiment of the inventive concept.

FIG. 6 is a block diagram illustrating a semiconductor device 200 according to at least one other example embodiment of the inventive concepts. Referring to FIG. 6, the semiconductor device 200 includes a CPU 210, a ROM 220, a RAM 230, secured storage 240, a verify status register 250, and an interconnector 260. The semiconductor device 200 may replace functions of the ROM 220 by using firmware or a function loaded onto the RAM 230 through the above components. In particular, in the case of the semiconductor device 200 according to at least one example embodiment of the inventive concepts, functions, which are unnecessary, from among the functions of the ROM 220 may be set such that the unnecessary functions are excluded in booting and such that a previous patch version of a function is not used.

The CPU 210 may execute software or an application (e.g., an application program, an operating system, or device drivers) to be run in the semiconductor device 200. The CPU 210 may run functions or firmware programmed in the ROM 220 depending on a boot sequence. In the case where a patchable function (e.g., 222) of the ROM 220 is called and is run, the CPU 210 may run a firmware verification and decryption function 226. As the firmware verification and decryption function 226 is run, the CPU 210 may verify or authenticate a function or firmware provided for the patch. The CPU 210 may run the replacement function loaded onto the RAM 230 instead of the function of the ROM 220 to be patched.

Codes, firmware, or functions for driving or controlling the semiconductor device 200 may be programmed in the ROM 220. For example, firmware for performing basic functions of the semiconductor device 200 manufactured for a particular purpose may be programmed in the ROM 220. Alternatively, a code, which defines sequences to be performed in the process of starting the semiconductor device 200 (i.e., in booting), such as a boot loader may be programmed in the ROM 220. In particular, patchable functions 222 and 224 are programmed in the ROM 220 according to at least one example embodiment of the inventive concepts. The patchable functions 222 and 224 mean functions or firmware to be updated later. In addition, the firmware verification and decryption function 226 for replacing or updating the patchable functions 222 and 224 may be programmed in the ROM 220. The ROM 120 may be implemented with at least one of a mask ROM, a programmable ROM (PROM), an erasable PROM (EPROM), and an electrically erasable PROM (EEPROM).

The RAM 230 may be used as a working memory of the semiconductor device 200. Software (or firmware) or data for controlling the semiconductor device 200 may be loaded onto the RAM 230. The stored software and data may be driven or processed by the CPU 210. According to at least one example embodiment of the inventive concepts, firmware 232 for patching a function or firmware of the ROM 220 may be loaded onto the RAM 230. The firmware 232 may be authenticated by using a public key/electronic signature 242 before being loaded onto the RAM 230. The authenticated firmware 232 may be decrypted and loaded onto the RAM 230. The patchable functions 222 and 224 may be replaced or updated by using the firmware 232 loaded onto the RAM 230.

The secured storage 240 is provided as a non-volatile storage medium of the semiconductor device 200. The public key/electronic signature 242 for authenticating the firmware 232 may be stored in the secured storage 240. The firmware 232 is provided to the semiconductor device 200 as encrypted data. Accordingly, the firmware 232 is loaded after being decrypted by the firmware verification and decryption function 226. A decryption key 244 that is used to decrypt the firmware 232 may be stored in the secured storage 240.

The secured storage 240 may further include a rollback counter 246, a disable flag 248, and an authority key 249. The rollback counter 246 directs a patch version of the firmware 232. For example, according to at least some example embodiments of the inventive concepts, the rollback counter 246 stores patch version information. For example, when a version of the firmware 232 generated for the patch and a count value programmed in the rollback counter 246 are not matched, the execution of the firmware 232 may be blocked. It may be possible to prevent an attempt of a malicious attack using a previous version of firmware 232 through the rollback counter 246. The disable flag 248 is a flag value for disabling a function or firmware, which is erroneous or unnecessary, from among functions or firmware existing in the ROM 220 in booting. The authority key 249 may provide an authority key according to a user authority for authentication (or verification).

The verify status register 250 stores a result of authenticating or verifying the firmware 232 loaded onto the RAM 230. Because the verify status register 250 stores the authentication result of the firmware 232 provided for patching the function or firmware implemented in the ROM 220, the verify status register 150 may be implemented with a volatile memory.

The interconnector 260 is provided as a bus or channel for providing a network between internal hardware components of the semiconductor device 200.

According to the semiconductor device 200 according to at least one example embodiment of the inventive concepts, firmware or functions programmed in the ROM 220 may be patched by firmware or functions loaded onto the RAM 230.

In particular, firmware or a function may require a user authentication procedure in the patch process. Firmware or functions only verified through the authentication may be decrypted and loaded onto the RAM 230. In addition, the execution of firmware having a mismatched version may be blocked by applying the rollback counter 246. Firmware or functions, which are erroneous or unnecessary, from among firmware or functions of the ROM 220 may be blocked by using the disable flag 248. Accordingly, the semiconductor device 200 according to at least one example embodiment of the inventive concepts may provide a high performance of security against an attack or an error that may occur in the process of patching the ROM 220 prone to security.

Figure 7:
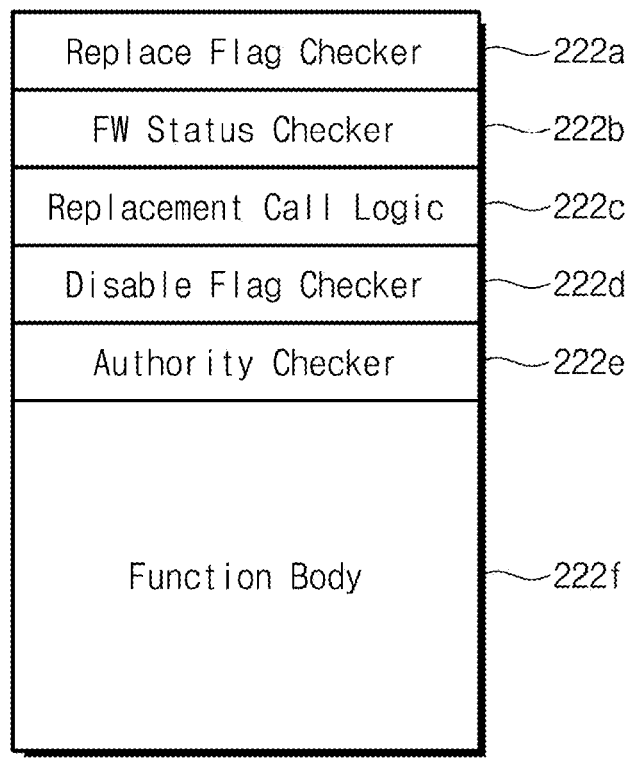
FIG. 7 is a block diagram illustrating a patchable function of a ROM of FIG. 6.

FIG. 7 is a block diagram illustrating a patchable function of a ROM of FIG. 6. Referring to FIG. 7, the patchable function 222 may include a replace flag checker 222a, a firmware status checker 222b, replacement call logic 222c, a disable flag checker 222d, an authority checker 222e, and a function body 222f, each of which may be embodied by, for example, computer-executable instructions within the patchable function 222. The replace flag checker 222a checks a value of a replacement flag included in the firmware 232. When the patchable function 222 is called from the CPU 210, first, the replace flag checker 222a checks whether the patchable function 222 is capable of being replaced with a function or the firmware 232 loaded onto the RAM 230. The replacement flag indicating whether functions loaded onto the RAM 230 are capable of replacing respective functions of the ROM 220 exists in a particular field of the firmware 232. The replace flag checker 222a checks the value of the replacement flag written in the decrypted firmware 232 and may determine whether it is possible to replace the patchable function 222.

The firmware status checker 222b checks a verification result of the firmware 232, which is stored in the verify status register 250. When a value of a firmware verification status corresponds to a verify pass, the firmware status checker 222b performs a patch operation using the firmware 232. In contrast, when the value of the firmware verification status corresponds to a verify fail, the firmware status checker 222b may stop overall operations using the firmware 232. The firmware status checker 222b may set overall sequences such that the function body 222f programmed in advance in the ROM 120 is run.

The replacement call logic 222c monitors whether the patchable function 222 is called by the CPU 210. When codes or functions programmed in the ROM 220 are called, the patchable function 222 may be called, or a function that does not support a patch function may be called. When the patchable function 222 is called, the replacement call logic 222c may enable a sequence for patching a function or firmware.

The disable flag checker 222d blocks the execution of firmware or functions, which are erroneous or unnecessary, from among firmware or functions recorded at the ROM 220 with reference to the disable flag 248. The authority checker 222e may provide a patch authority depending on an authority level included in a look-up table of the firmware 232.

The function body 222f is a function of a first programmed form of the patchable function 222. Even though the patchable function 222 is called, when the authentication of the firmware 232 loaded onto the RAM 230 fails or when it is no need to replace, the function body 222f may be run.

Pieces of information included in the patchable function 222 are briefly described above. However, it may be well understood that various functions are further added to the patchable function 222 depending on an authentication manner or an authority level.

Figure 8:
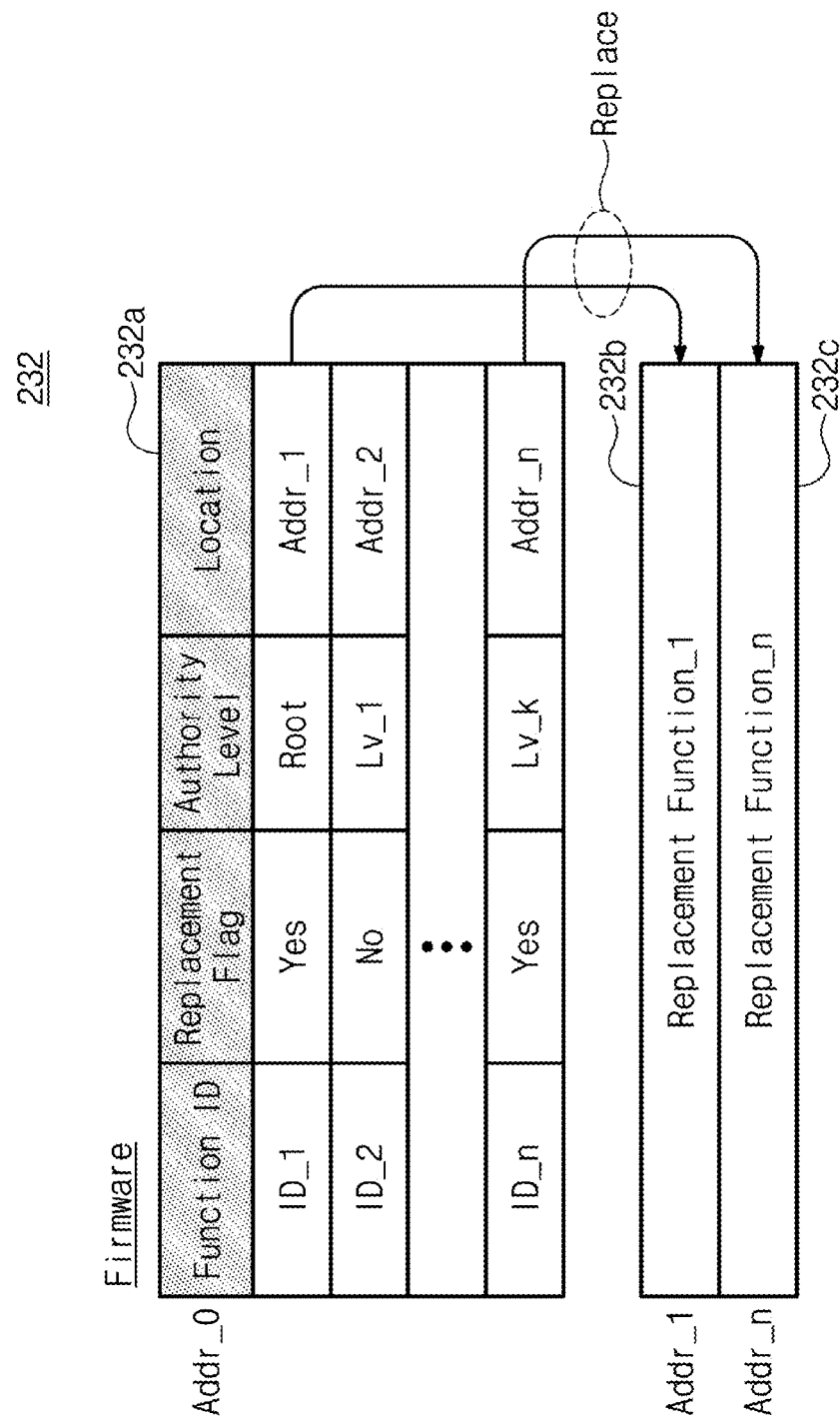
FIG. 8 is a diagram illustrating a firmware structure of the inventive concept.

FIG. 8 is a diagram illustrating a firmware structure according to at least one example embodiment of the inventive concepts. Referring to FIG. 8, the firmware 232 loaded onto the RAM 230 may include a look-up table 232a and replacement functions 232b and 232c.

When the patchable function 222 or 224 of the ROM 220 is run, the look-up table 232a provides the CPU 210 with information about whether replacement is possible and information about locations of the replacement functions 232b and 232c on the RAM 230. The look-up table 232a includes information about a function identifier (ID), a replacement flag, an authority level, and a location of a replacement function. For example, it is assumed that the patchable function 222 of the ROM 220 is run. When the function identifier of the patchable function 222 is "ID_1", the patch of the patchable function 222 may be performed with reference to information of the look-up table 232a corresponding to "ID_1". A value of the replacement flag corresponds to "Yes", and a location of the replacement function corresponds to an address Addr_1 of the RAM 230. In addition, the case where the authority level corresponds to "Root" means that a user requiring patch or replacement has a root authority of a system. Accordingly, the patchable function 222 may be patched by a replacement function 232b loaded at the address Addr_1 of the RAM 230, and it is understood that the user requiring the patch is a user having a root authority.

In contrast, with regard to the function identifier "ID_2" of the look-up table 232a, a value of the replacement flag corresponds to "No". Accordingly, in the case where a function corresponding to the function identifier "ID_2" is run, the patch using the function or firmware loaded onto the RAM 230 may not be performed. A value of the replacement flag corresponding to the function identifier "ID_n" is "Yes". Accordingly, when a function corresponding to the function identifier "ID_n" is run, the patchable function 224 may be patched by a replacement function 232c loaded at the address Addr_n of the RAM 230.

Figure 9:
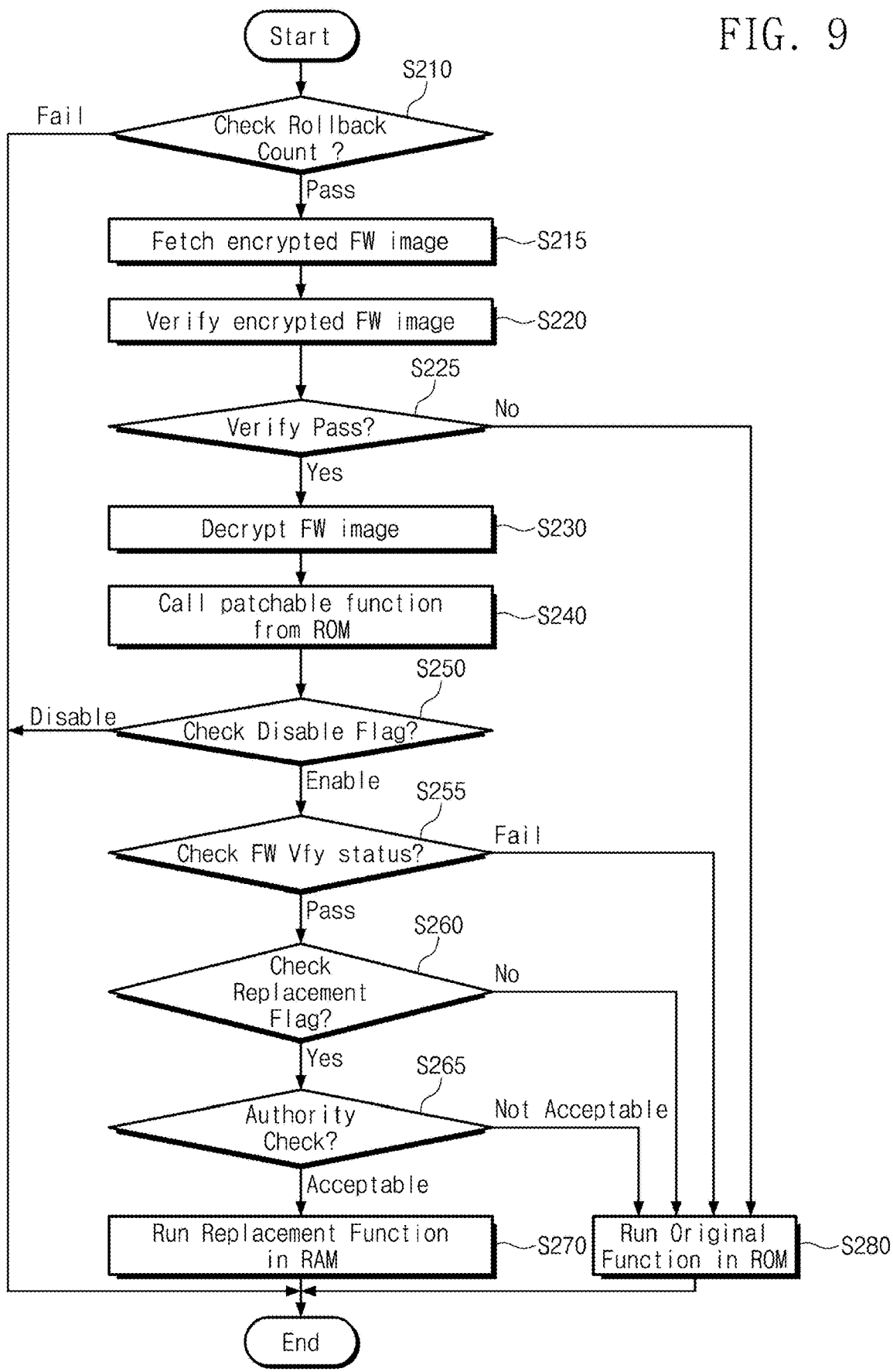
FIG. 9 is a flowchart illustrating a procedure of patching a function of a ROM according to at least one example embodiment of the inventive concepts.

FIG. 9 is a flowchart illustrating a procedure of patching a function of a ROM according to at least one example embodiment of the inventive concepts. Referring to FIG. 9, in the case where a patchable function or firmware programmed in the ROM 220 (refer to FIG. 6) is called, the semiconductor device 200 (refer to FIG. 1) according to at least one example embodiment of the inventive concepts performs user authentication and decryption on a firmware image loaded onto the RAM 230. Whether replacement is possible or a location of a replacement function may be checked with reference to the look-up table 232a (refer to FIG. 8) stored in the RAM 230.

In operation S210, the CPU 210 checks the rollback count. The CPU 210 may determine whether a value of the rollback counter 246 written in the secured storage 240 is matched with a patch version of the firmware 232 loaded onto the RAM 230. When the value of the rollback counter 246 is not matched with the patch version of the firmware 232 (Fail), the procedure is terminated. When the value of the rollback counter 246 is matched with the patch version of the firmware 232 (Pass), the procedure proceeds to operation S215.

In operation S215, the CPU 210 fetches or receives a firmware image encrypted and digitally signed. The firmware image may be input from the outside of the semiconductor device 200. For example, the firmware image may be provided from storage or update equipment that is provided to update the firmware of the semiconductor device 200.

In operation S220, the CPU 210 performs an authentication or verification operation on the encrypted firmware image. For example, the CPU 210 may compare a public key and an electronic signature included in the firmware image with the public key/electronic signature 242 stored in the secured storage 240. When a comparison result indicates that the public keys are not matched or the electronic signatures are not matched, it may be determined that the verification of the encrypted firmware image fails. In addition, the CPU 210 stores the verification result of the encrypted firmware image in the verify status register 250.

In operation S225, the CPU 210 performs the operation branch according to the verification result of the encrypted firmware image 232. When it is determined that the verification of the encrypted firmware image fails (No), the procedure proceeds to operation S280. In contrast, when it is determined that the verification of the encrypted firmware image succeeds (Yes), the procedure proceeds to operation S230.

In operation S230, the CPU 210 decrypts the encrypted firmware image. For example, the CPU 210 may decrypt the encrypted firmware image by using the decryption key 144 stored in the secured storage 240. The decrypted firmware 232 may be loaded onto the RAM 230. In the decryption process, the CPU 210 may generate the look-up table 232*a* and may generate an address of each replacement function on the RAM 230. After the decrypted firmware 232 is loaded onto the RAM 230, the look-up table 232*a* may be used whenever patchable functions of the ROM 220 are called.

In operation S240, a patchable function is called by the CPU 210. For example, the patchable function 222 may be called. A call event of a patchable function may occur during booting or may occur while the semiconductor device 200 operates.

In operation S250, the CPU 210 checks the disable flag 248. When a value of the disable flag 248 corresponds to "Disable", the procedure may be terminated. In contrast, when a value of the disable flag 248 corresponds to "Enable", the procedure proceeds to operation S255.

In operation S255, the CPU 210 checks the verify status register 250 for the purpose of determining the validity of the decrypted firmware 232. That is, to refer to a result of the verification performed in operation S220, the CPU 210 reads the verification result stored in the verify status register 250. When a value of the verify status register 250 corresponds to a verify fail, the procedure proceeds to operation S280. In contrast, when the value of the verify status register 250 corresponds to a verify pass, the procedure proceeds to operation S260.

In operation S260, the CPU 210 checks the replacement flag included in the look-up table 232*a*. For example, in the case of the patchable function 222 called in operation S240, the replacement flag corresponding to the function identifier ID_1 may be checked on the look-up table 232*a*. When a value of the replacement flag corresponds to "Yes" indicating "replaceable", the procedure proceeds to operation S265. In contrast, when the value of the replacement flag corresponds to "No" indicating "irreplaceable", the procedure proceeds to operation S280.

In operation S260, the CPU 210 checks an authority level included in the look-up table 232*a*. When the authority level indicates "Acceptable", the procedure proceeds to operation S270. However, when the authority level indicates "Not Acceptable", the procedure proceeds to operation S280.

In operation S270, the CPU 210 runs the replacement function that is loaded onto the RAM 230 and is used to replace the called patchable function. For example, the replacement function 232*b* corresponding to the address Addr_1 associated with the function identifier ID_1 may be run instead of the patchable function 222 called in operation S240.

In operation S280, the CPU 210 may run the function 222 originally stored in the ROM 220. That is, in the case where the verification of the encrypted firmware image fails or a value of a replacement flag corresponds to "No" being "Not Acceptable", the CPU 210 may execute the function 222 originally stored in the ROM 220.

According to at least one example embodiment of the inventive concepts, a method for verifying firmware or a function loaded onto the RAM 230 for the purpose of replacing firmware or a function existing in the ROM 220 is briefly described above.

Figure 10:
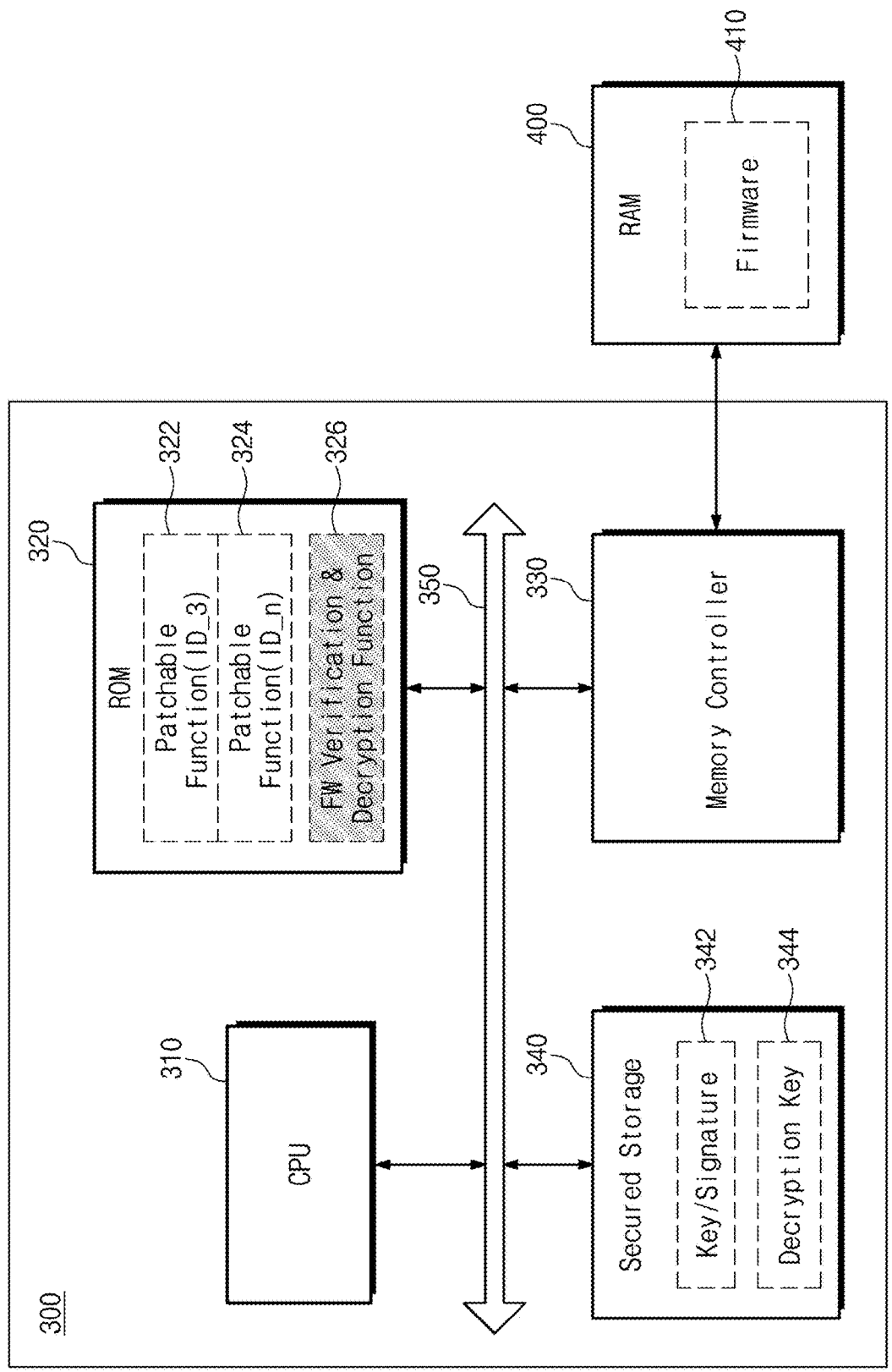
FIG. 10 is a block diagram illustrating another embodiment of the inventive concept.

FIG. 10 is a block diagram illustrating at least another example embodiment of the inventive concepts. Referring to FIG. 10, a semiconductor device 300 according to at least one example embodiment of the inventive concepts may use a RAM 400 being not embedded as a working memory. Accordingly, the semiconductor device 300 may control and access the RAM 400 by using a memory controller 330. An operation of the semiconductor device 300 of FIG. 10 is substantially identical of that of FIG. 1 except that the RAM 400 is placed outside the semiconductor device 300. Thus, a detailed description thereof will be repeated here.

According to at least one example embodiment of the inventive concepts, a high performance of security may be provided when patching the ROM with firmware or functions loaded onto a RAM. Accordingly, firmware or functions implemented in the ROM of a semiconductor device are stably updated.

While the inventive concept has been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. A method for patching a patchable function programmed in a read only memory (ROM) of a semiconductor device by using firmware loaded onto a first memory, the method comprising:
   receiving an encrypted and digitally signed firmware image;
   generating a verification result by verifying the firmware image by using a public key;
   decrypting the firmware image by using a secret key depending on the verification result;
   loading firmware decrypted from the firmware image onto the first memory; and
   running a replacement function corresponding to an identifier of the patchable function included in the firmware, when the patchable function is called.

2. The method of claim 1, wherein the ROM stores a firmware verification and decryption function for authenticating the firmware image by using the public key and decrypting the encrypted firmware image by using the secret key.

3. The method of claim 1, wherein the firmware includes:
   a replacement function for replacing the patchable function; and
   a look-up table for mapping the patchable function and the replacement function.

4. The method of claim 3, wherein the look-up table includes a replacement flag indicating whether replacement of the patchable function with the replacement function is possible, and an address of the replacement function on the first memory, and the first memory is a random access memory (RAM).

5. The method of claim 4, wherein the patchable function includes a function of checking the replacement flag and checking the verification result, when called by a central processing unit (CPU).

6. The method of claim 5, wherein the semiconductor device further includes secured storage for storing the public key and the secret key.

7. The method of claim 6, wherein the secured storage is controlled so as to be accessible by only the CPU.

8. The method of claim 7, wherein the semiconductor device further includes a register for storing the verification result.

9. The method of claim 1 wherein,
the semiconductor device further includes a rollback counter for storing patch version information of the patchable function, and
the method further comprises:
comparing version information stored in the firmware image and the rollback counter.

10. The method of claim 9, further comprising:
terminating an execution of the patchable function in response to the rollback counter and the version information not being matched.

11. A semiconductor device comprising:
a ROM in which at least one patchable function is programmed;
a RAM onto which firmware having a replacement function for replacing the at least one patchable function is loaded;
a central processing unit (CPU) configured to perform user authentication on the firmware by running a firmware verification and decryption function programmed in the ROM and to run the replacement function by using the firmware when the at least one patchable function is called;
secured storage configured to store a public key and an electronic signature for the user authentication, and a secret key for decrypting the firmware; and
a verification result register configured to store a result of the user authentication,
wherein the firmware includes a look-up table for mapping the at least one patchable function and the replacement function.

12. The semiconductor device of claim 11, wherein the at least one patchable function includes a function identifier, and wherein the look-up table includes a replacement flag and an address of the replacement function on the RAM, for each function identifier.

13. The semiconductor device of claim 12, wherein, when the result of the user authentication stored in the verification result register corresponds to a fail or when the replacement flag is disabled, the replacement function is inhibited from being run, and the at least one patchable function is run.

14. The semiconductor device of claim 13, wherein the at least one patchable function includes a function of checking the replacement flag and checking the result of the user authentication, when called by the CPU.

15. The semiconductor device of claim 12, wherein the look-up table further includes authority level information of a user for each function identifier.

16. The semiconductor device of claim 11, further comprising:
a rollback counter configured to store patch version information of the at least one patchable function,
wherein the central processing unit is configured to compare version information stored in the firmware with the rollback counter.

17. The semiconductor device of claim 16, wherein, the central processing unit is configured such that, when the version information stored in the firmware and the rollback counter are not matched, the central processing unit terminates an execution of the patchable function and the user authentication.

18. A patch method of a semiconductor device which runs a first function programmed in a ROM, the method comprising:
receiving an encrypted and digitally signed firmware image to be loaded onto a RAM to replace the first function;
performing user authentication on the firmware image;
decrypting the firmware image and loading the decrypted firmware image onto the RAM, depending on a result of the user authentication; and
running a second function included in the firmware depending on the result of the user authentication, when the first function is called.

19. The method of claim 18, further comprising:
running the first function when the user authentication corresponds to a fail.

20. The method of claim 18, wherein the performing of the user authentication comprises:
comparing a public key and an electronic signature included in the firmware image with a public key and an electronic signature stored in secured storage provided in the semiconductor device.

* * * * *